J. A. STAPLES.
TEMPORARY CONNECTING AND APPLYING DEVICE FOR AUTOMOBILE TIRE CHAINS.
APPLICATION FILED OCT. 5, 1912.
1,072,522.
Patented Sept. 9, 1913.
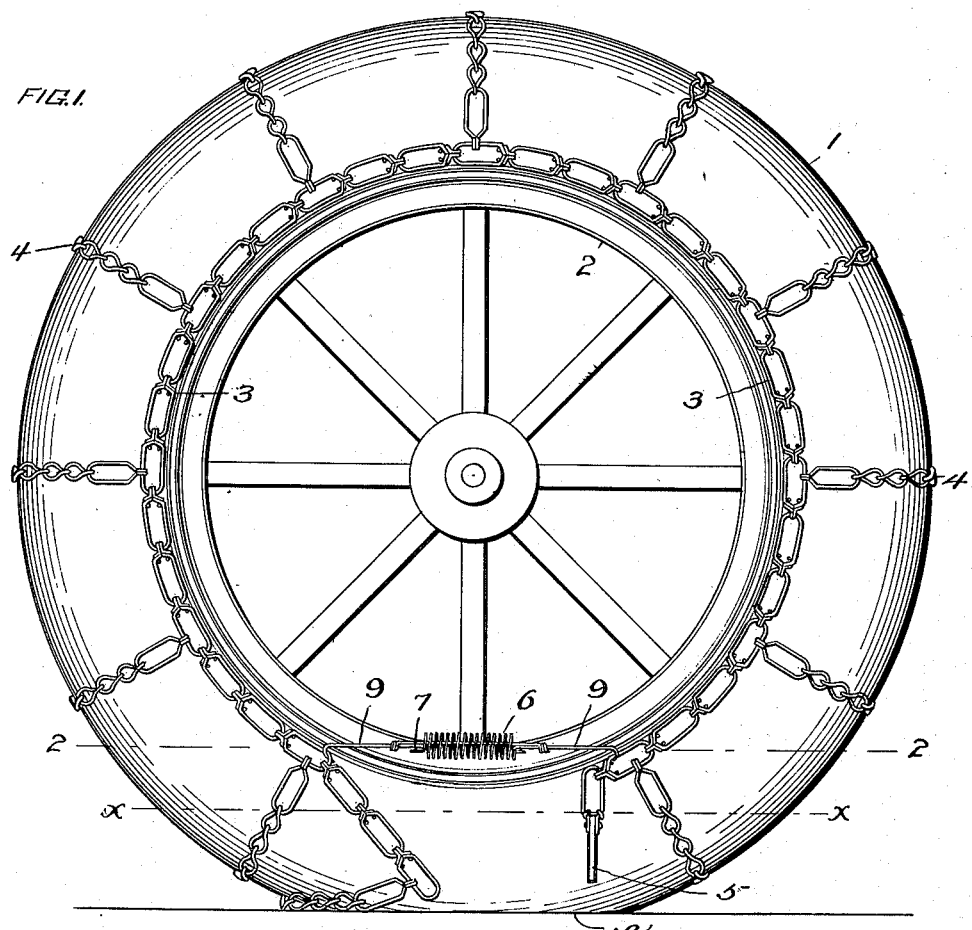
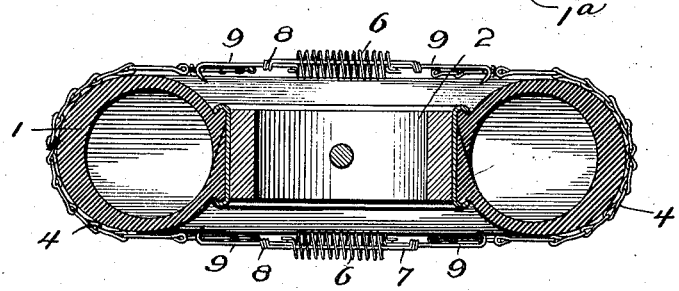
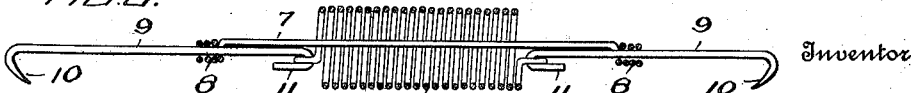

UNITED STATES PATENT OFFICE.

JOHN A. STAPLES, OF NEWBURGH, NEW YORK.

TEMPORARY CONNECTING AND APPLYING DEVICE FOR AUTOMOBILE TIRE-CHAINS.

1,072,522.　　　　　Specification of Letters Patent.　　Patented Sept. 9, 1913.

Application filed October 5, 1912. Serial No. 724,086.

*To all whom it may concern:*

Be it known that I, JOHN A. STAPLES, a citizen of the United States, residing at Newburgh, in the county of Orange and State of New York, have invented certain new and useful Improvements in Temporary Connecting and Applying Devices for Automobile Tire-Chains; and I do hereby declare the following to be a full, clear, and exact description of the invention, such as will enable others skilled in the art to which it appertains to make and use the same.

My invention consists in the novel features hereinafter described, reference being had to the accompanying drawing which shows one embodiment of my invention selected by me for the purpose of illustrating the invention and said invention is fully disclosed in the following description and claims.

My invention relates to means for facilitating the application of anti-skidding gripping devices, (which comprise a pair of parallel, circumferential flexible members, connected at suitable intervals by transverse tread engaging members, and provided at their meeting ends with means for permanently connecting said circumferential members,) to the pneumatic or other resilient tires of a motor vehicle. In the practical use of these anti-skidding gripping devices, which are usually designated for convenience of reference "tire chains" considerable difficulty is experienced in applying them to the tires of the vehicle, even under favorable conditions, as when the vehicle is supported upon a level surface, as in a garage or on a piece of hard and lever road, owing largely to the fact that the portion of the tire which engages the supporting surface is flattened, so as to constitute a portion of considerable area and peripheral extent beneath which the tire chain cannot be carried and as the circumferential members of the chain are considerably shorter than the periphery of the tire the connections for securing the ends of said circumferential members cannot be united until the entire chain is applied, and the ends of said members can be drawn into close proximity. It is, therefore, customary in applying these tire chains to elevate one wheel of the vehicle at a time clear from the ground or floor to enable the chain to be drawn entirely around the same. In some cases the tire is partially deflated until the gripping chain is placed in position and permanently secured, after which the tire is re-inflated. In some instances, the tire chain is placed partially around the wheel and the vehicle is moved forward or backward far enough to bring the tire upon a portion of the chain between its ends, so as to permit the ends of the circumferential members to be permanently united, and in some cases the chains are laid upon the floor or surface and the vehicle moved to bring the tire upon the central portion thereof, when the end portions are brought around and secured. As a matter of fact, under the most favorable conditions the application of these anti-skidding devices is attended with considerable annoyance and loss of time and the difficulties are vastly increased when as is more often the case, the tire chains must be applied on the road in bad weather, when the tires are partially embedded in mud. Under these conditions it is often impossible to move the vehicle, and it is frequently difficult to use a lifting jack. As a consequence many operators of automobiles will take a considerable risk in driving over wet and slippery roads, rather than subject themselves to the delay, and annoyance of applying the anti-skidding devices.

The object of my invention is to provide temporary connecting means for temporary application to the circumferential members of a tire chain, or anti-skidding gripping device of the kind described, which comprises a yielding member, and temporary attaching devices for engaging the circumferential members forward and in rear of the portion of the tire which rests upon the ground, and on both the inner and outer sides of the wheel, to hold the gripping device firmly in place on the tire, and automatically draw it taut and into correct position, so that the vehicle may be moved under power to bring the loose end portions of the gripping device into such a position as to permit the permanent connections with which the circumferential members are provided, to be united, when the said temporary attaching devices will be removed.

I ordinarily use a light spring construction for my temporary attaching devices but I prefer to provide them with retaining means for limiting the extent to which the devices may be extended to prevent the straining of the springs, and to preclude the possibility of the gripping device or tire chain becoming disengaged from the tire.

In the accompanying drawing I have illustrated the best form in which I have contemplated embodying my invention, in which drawing—

Figure 1 represents a wheel having a pneumatic tire, and showing it as it would appear when supporting a portion of the weight of a motor vehicle, the wheel having applied thereto an anti-skidding gripping device, held in place by my improved temporary attaching devices. Fig. 2 is a horizontal section on line 2—2 Fig. 1. Fig. 3 is a detail sectional view drawn to an enlarged scale, of one of my temporary attaching devices, detached.

Referring to the accompanying drawing, 1 represents a pneumatic or other resilient tire mounted upon a wheel, 2, the lower portion of the tire being flattened at 1ª as is the case when the weight of the vehicle is resting upon the wheel, and the tire is supported on a flat level surface.

3, 3, represent the circumferential members of a tire chain, or anti-skidding gripping device, and 4, 4, represent the transversely disposed tread engaging chains. Each of the circumferential chains is provided with means for permanently connecting its ends together, which may be of any known or usual construction. In the drawing I have indicated a connecting device, 5, of any preferred form which is provided at one end of each of the circumferential members, 3, and is adapted to be engaged with a link or ring at the other end of the member.

In the embodiment of my invention, selected by me for purposes of illustration, and best illustrated in Fig. 3, 6 represents a light coil spring, in this case an expansion spring, through the center of which extends a non-expansible guiding and limiting device, 7, provided at each end beyond the coil, 6, with guiding portions, 8, formed in this instance by bending the end portions of the part 7 into a coil of small diameter. Through the guiding portions or coils 8 extend hook rods, 9, in opposite directions, the outer ends of said rods being provided with detachable securing devices for engaging the circumferential members of the tire chain, preferably in the form of open hooks as shown. The inner end of each of said hook rods is provided with a stop, 11, adapted to engage the adjacent guiding portion, 8, when the hook is drawn outwardly to limit the outward movement thereof. The inner ends of said hooks are connected to the opposite ends of the light spring coil 6. Obviously if the hook rods 9, 9, are drawn in opposite directions they will expand the spring, 6, the lost motion provided between the hook rods 9 and the non-expansible limiting device 7 permitting a certain extent of yield on the part of the spring, and if the pull on the said hooks is sufficient the stops, 11, will be forced into engagement with the guiding portions 8 of the limiting device 7 and prevent the further expansion of the spring thus preventing injury thereto and transferring the tension on the hooks to the non-expansible device 7 thus preventing the device from extending to such an extent as to permit the tire chain to slip around the tire, or to become detached therefrom. I do not, however, limit myself to the use of an expansion spring nor to the exact details of construction herein shown and described.

It will be understood that two of my improved temporary attaching devices are provided and used in combination with each tire chain, that is to say, one for each of the circumferential members thereof.

The manner of using the devices is illustrated in Figs. 1 and 2 of the drawing. The tire chain, or anti-skidding gripping device is placed on the tire and the ends of the circumferential members 3 are brought down to a point near the ground and drawn as taut as possible. Obviously the transverse or tread portions, 4, adjacent to the meeting ends of the circumferential members cannot be drawn under the flattened portion 1ª of the tire, and this difficulty is greatly enhanced if the tire is embedded in mud, as it frequently is, up to a point indicated by the dotted line $x$—$x$ and in some cases even higher. The operator now takes one of the temporary connections illustrated in Fig. 3, and inserts the hook, 10, at one end thereof in the circumferential member, 3, on either the inside or the outside of the wheel (and preferably the one on the inner side) as closely adjacent to one end thereof as will insure a substantial draft longitudinally on said member, and then without materially expanding the spring, catches the other hook, 10, in said member adjacent to the other end thereof, so that the temporary fastening device will occupy a position substantially horizontal. The operator then takes another of said temporary connections, and attaches one hook, 10, thereof in the other circumferential member, 3, and draws the tread members around the tread toward the outer side of the tire, thus expanding the temporary securing device on the inner side, and the operator then draws the other hook, 10, so as to expand the spring 6 and engages it with said circumferential member adjacent to its other end. The tire chain will then be adjusted on the tire in such manner as to practically distribute the strain on the temporary connections between the two springs 6, 6, (see Fig. 2). Obviously both springs 6 may be expanded when applied, but I find in practice that owing to the tendency of the gripping device or tire chain to slip laterally before the ends of both its circumferential members are connected, the best results can be obtained in the manner previously described.

It will be observed that after the tire chain has been secured by means of the temporary securing devices, the lowermost transverse chains, or tread engaging members which engage the tire are usually not drawn quite to their proper positions owing to the flattened portion of the tire resting on the ground and one or more of said tread portions will not be brought into engagement with the tire at all, but will lie on the ground with the free ends of the circumferential members. The temporary securing devices will, however, hold the gripping device firmly in position on the tire and when the vehicle is started will give traction to the wheel, and as the wheel rotates and brings the portion of the tire adjacent to the temporary securing devices away from the ground, the pull of the springs, 6, is exerted on both the inner and outer circumferential members, and draws the tread engaging portions to their proper positions, and by stopping the vehicle with the free ends of the members, 3, at the upper part of the wheel, the remaining tread portions can be placed in position on the tire and the permanent connectors, 5, can be operated to permanently secure the entire gripping device in position. I prefer to release the temporary connecting devices before applying the permanent connectors, 5, so as to allow the meeting ends of the circumferential members to be drawn together and the circumferential members stretched as tightly as possible in securing the permanent connecting devices in position. This can be readily accomplished by drawing the ends of the circumferential member on one side at a time into close proximity then releasing the temporary connection and securing the ends together by the permanent connection without permitting the gripping device to become disengaged from the tire. In case the traction on the gripping device, in starting, is sufficient to cause the lowermost tread engaging member, 4, to slip on the tread of the tire, the springs, 6, will yield to a certain extent, but if the strain becomes too great the stops, 11, will engage the guides, 8, and limit the extension of the devices thus interposing an unyielding resistance in each and holding the gripping device positively to its work, thus preventing the gripping device from slipping around the tire or becoming detached therefrom. In such case, as soon as the cause of the unusual tractional stress is passed over, the springs, 6, 6, will cause the gripping device to adjust itself to the tire and will hold it in a self-adjusted position until the permanent connections for securing the ends of the circumferential members are made.

By using these temporary connecting devices each of the tire chains, or anti-skidding gripping devices can be applied to the tire and held thereby in a few seconds, and the tire chains can be applied as easily on the road and in bad weather as in a garage, thus greatly facilitating the use of such anti-skidding devices, by making it possible to apply them simply, easily, and with but a momentary interruption of the actual running, and enabling them to be applied where the driving wheel is in deep mud, under conditions in which it is extremely difficult, if not impossible, to apply them without the use of my improved devices. Thus the operator is able to quickly apply the chains where the vehicle is deeply mired and pull out of a piece of bad road, to a point where he can find a better footing, where the permanent connections can be made fast, as the temporary securing devices will hold the tire chain in place until removed therefrom.

My improved devices act like two extra pairs of hands in holding the loose ends of both the inner and outer circumferential members of the gripping device in position until the wheel can be turned to a position in which the remaining tread sections can be applied to the tire and the circumferential members permanently connected.

What I claim and desire to secure by Letters Patent is:

1. In combination with a tire gripping device provided with circumferential members, transverse tread engaging members, and permanent securing devices for connecting the ends of said circumferential members, means independent of said circumferential members and the permanent securing devices therefor for temporarily connecting portions adjacent to the ends of said circumferential members, on the inner and outer faces of the tire, across and above the flattened portion of the tire in engagement with the road bed, to facilitate the application of the gripping device to the tire.

2. In combination with a tire gripping device provided with circumferential members, transverse tread engaging members, and permanent securing devices for connecting the ends of said circumferential members, means independent of said circumferential members and the permanent securing devices therefor for temporarily and yieldingly connecting portions adjacent to the ends of said circumferential members on the inner and outer faces of the tire across and above the flattened portion of the tire in engagement with the road bed, to facilitate the application of the gripping device to the tire.

3. In combination with a tire gripping device provided with circumferential members, transverse tread engaging members, and permanent securing devices for connecting the ends of said circumferential members, means for temporarily and yieldingly connecting portions adjacent to the ends of said circumferential members on the inner and outer faces of the tire across and above the flattened portion of the tire in engagement with the road bed to facilitate the application of the gripping device to the tire, and means for limiting the extent of yield of said yielding temporary connecting means.

4. In combination with a tire gripping device provided with circumferential members, transverse tread engaging members, and permanent securing devices for connecting the ends of said circumferential members, temporary connections for said circumferential members on the inner and outer faces of the tire provided at each end with detachable securing devices for engaging said members adjacent to their ends, adjacent to each end of the flattened portion of the tire in engagement with the road bed for facilitating the application of the gripping device to the tire, at least one of said temporary connections being provided with a yielding elastic member located between its said detachable securing devices.

5. In combination with a tire gripping device provided with circumferential members, transverse tread engaging members, and permanent securing devices for connecting the ends of said circumferential members, expansible temporary connecting devices for the circumferential members on the inner and outer faces of the tire each provided with detachable securing devices for engaging the circumferential members adjacent to their ends, adjacent to opposite ends of the flattened portion of the tire in engagement with the road bed and means for positively limiting the expansion of the said temporary connecting devices.

6. In combination with a tire gripping device provided with circumferential members, transverse tread engaging members and permanent securing devices for connecting the ends of said circumferential members, temporary connecting devices for the circumferential members on the inner and outer faces of the tire, each provided with detachable securing devices for engaging the circumferential members adjacent to their ends at points adjacent to opposite ends of the flattened portion of the tire in engagement with the ground, at least one of said temporary connecting devices being provided with a spring connected with its securing devices, said securing devices being also connected by a non-expansible device providing a certain amount of lost motion, for limiting the extent of yield of said spring, and transferring the strain on its connected securing devices directly to said non-expansible device.

7. In combination with a tire gripping device provided with circumferential members, transverse tread engaging members and permanent securing devices for connecting the ends of said circumferential members, temporary connecting devices for the circumferential members on the inner and outer faces of the tire, each provided with detachable securing devices for engaging the circumferential members adjacent to their ends at points adjacent to opposite ends of the flattened portion of the tire in engagement with the ground, each of said temporary connections being provided with a spring connected with its securing devices, and a non-expansible device connecting its securing devices by means providing lost motion between them and said non-expansible member, for transferring the strain on the securing devices to the non-expansible member when the spring has yielded to a predetermined extent.

8. In combination with a circumferential member of a tire gripping device of the kind described, and the permanent connecting means for uniting the meeting ends thereof, means independent of said circumferential member and the permanent connecting means therefor, for temporarily connecting portions adjacent to the ends of said circumferential member across and above the flattened portion of the tire in engagement with the road bed, to facilitate the application of the gripping device to the tire, comprising a yielding member, and securing devices connected therewith for engaging the said circumferential member at points adjacent to its ends, at least one of said securing devices being detachable.

In testimony whereof I affix my signature, in the presence of two witnesses.

JOHN A. STAPLES.

Witnesses:
  PETER CANTLINE,
  HARRY L. WELLS.